(12) United States Patent
Blades et al.

(10) Patent No.: US 12,251,887 B2
(45) Date of Patent: Mar. 18, 2025

(54) SEALING OF PIPE LINERS

(71) Applicant: W.E.Rawson Limited, Wakefield (GB)

(72) Inventors: David John Blades, Wakefield (GB); Alexander Charles Edward Johnson, Wakefield (GB)

(73) Assignee: W.E.Rawson Limited, Wakefield (GB)

(*) Notice: Subject to any disclaimer, the term of this patent is extended or adjusted under 35 U.S.C. 154(b) by 543 days.

(21) Appl. No.: 17/441,296

(22) PCT Filed: Mar. 19, 2020

(86) PCT No.: PCT/GB2020/050726
§ 371 (c)(1),
(2) Date: Sep. 21, 2021

(87) PCT Pub. No.: WO2020/193953
PCT Pub. Date: Oct. 1, 2020

(65) Prior Publication Data
US 2022/0186871 A1 Jun. 16, 2022

(30) Foreign Application Priority Data
Mar. 22, 2019 (GB) .................................... 1903946

(51) Int. Cl.
*B29C 65/00* (2006.01)
*B29C 53/48* (2006.01)
(Continued)

(52) U.S. Cl.
CPC .......... *B29C 66/1122* (2013.01); *B29C 53/48* (2013.01); *B29C 65/4815* (2013.01);
(Continued)

(58) Field of Classification Search
CPC ..................................................... B29C 53/48
See application file for complete search history.

(56) References Cited

U.S. PATENT DOCUMENTS 3,329,173 A 7/1967 Skoggard et al.
5,285,741 A * 2/1994 Askin ................... B29C 53/382
112/475.08
(Continued)

FOREIGN PATENT DOCUMENTS

DE 2606274 A 12/1977
EP 0098547 A1 1/1984
(Continued)

OTHER PUBLICATIONS

Machine translation JPH11235758A (Year: 1999).*
(Continued)

*Primary Examiner* — Jacob T Minskey
*Assistant Examiner* — Wayne K. Swier
(74) *Attorney, Agent, or Firm* — Troutman Pepper Locke LLP; Christopher J. Forstner; Scott A. Bergeson

(57) ABSTRACT

The present invention provides a method and apparatus of manufacturing a pipe liner for lining the inside of a pipe, for example a water or sewerage pipe requiring repair. The pipe liner is mainly formed of a fabric sleeve, or a plurality of fabric sleeves, and comprises a fluid-proof barrier coating on the inside surface of the pipe liner. The method involves arranging a strip of carrier material comprising a liquid sealant inside the fabric sleeve of the pipe liner and in registration with two opposing side edges of the sheet of fabric, facing an inner barrier coating of the fabric sleeve. The method can advantageously provide such a pipe liner with an inner barrier coating without everting the pipe liner after manufacture. The present invention may provide for avoiding internal cross-welding of pipe liners and a method for testing the integrity of the barrier coating of pipe liners.

12 Claims, 3 Drawing Sheets

(51) Int. Cl.
    *B29C 63/34* (2006.01)
    *B29C 65/48* (2006.01)
    *B29C 65/50* (2006.01)
    *B29C 65/52* (2006.01)
    *B29C 65/78* (2006.01)
    *D06H 5/00* (2006.01)

(52) U.S. Cl.
    CPC ........ *B29C 65/5042* (2013.01); *B29C 65/524* (2013.01); *B29C 65/7894* (2013.01); *B29C 66/0342* (2013.01); *B29C 66/1142* (2013.01); *B29C 66/4322* (2013.01); *B29C 66/7292* (2013.01); *B29C 66/72941* (2013.01); *B29C 66/7392* (2013.01); *D06H 5/006* (2013.01); *B29C 63/34* (2013.01)

(56) References Cited

U.S. PATENT DOCUMENTS

| | | |
|---|---|---|
| 9,709,206 B2 | 7/2017 | Duttenhoefer et al. |
| 2005/0092070 A1* | 5/2005 | Bhatti .................. G01M 3/045 73/40 |
| 2010/0000674 A1 | 1/2010 | Voigtmann |
| 2015/0328857 A1* | 11/2015 | Ueda ....................... B29C 63/36 138/98 |
| 2016/0305579 A1 | 10/2016 | Graham |
| 2017/0159869 A1* | 6/2017 | Parker .................... B32B 27/08 |

FOREIGN PATENT DOCUMENTS

| | | |
|---|---|---|
| JP | 11235758 A * | 8/1999 |
| JP | 2017217839 A | 12/2017 |

OTHER PUBLICATIONS

Search Report in priority application No. GB1903946.0, mailed Aug. 28, 2019.

International Search Report and Written Opinion in priority application No. PCT/GB2020/050726, mailed Aug. 12, 2020.

* cited by examiner

SEALING OF PIPE LINERS

Cross Reference to Related Applications:

This application is a 371 National Phase Application claiming priority to International Application No. PCT/GB2020/050726, filed 19 Mar. 2020, which claims priority to Great Britain Application No. GB1903946.0, filed 22 Mar. 2019, the entire contents of each of which are fully incorporate herein by reference.

FIELD

The present invention relates to a method of manufacturing pipe liners for use in repairing pipes such as water or sewage pipes, to a method of testing the integrity of such pipe liners and to apparatus for carrying out such methods. In particular, the present invention relates to the manufacture of a pipe liner comprising a longitudinal seam and a barrier coating on the inner surface of the pipe liner, for use with curable polymer compositions.

BACKGROUND

Underground pipes, such as mains water supply pipes and sewers, may degrade over time and/or develop cracks due to changes in temperature (e.g. freezing and thawing of water in or around the pipe) or forces exerted on the pipe by the ground and groundwater surrounding the pipe. Replacing such degraded or cracked pipes can be costly and difficult, particularly when the pipe is buried relatively deeply in the ground or is located underneath a structure. Therefore, such underground pipes are typically repaired in situ by forming a pipe lining—a barrier-coated continuous tubular structure—within the pipe to be repaired, covering at least the damaged section of pipe. This effectively forms a new pipe within the pipe to be repaired. One way of achieving this is to arrange a flexible sleeve (or pipe liner), such as a felt sleeve, impregnated with a curable resin, in contact with the inside surface of the pipe to be repaired and then allowing the resin to cure to form a self-supporting tubular structure within the pipe.

Such pipe liners are formed from rectangular sheets of flexible material by bringing together opposite side (long) edges of the sheet and stitching or welding these side edges together to form a longitudinal seam. Therefore the short edges of the sheet define the circumference of the pipe liner. The method of joining the side edges of the sheet together may have significant impacts on the properties of the pipe liner and of the pipe lining formed from it.

Before installation, the pipe liner is impregnated with a curable resin. The resin must not be allowed to cure until the pipe liner is in position in the pipe to be repaired. Once the pipe liner impregnated with the curable resin is installed in the pipe to be repaired, curing of the resin may be initiated, propagated or accelerated by heating or by irradiation with UV light, depending on the selection of the particular resin. Curing the resin with heat may involve applying hot water to the pipe liner through a suitable conduit. Curing the resin by irradiation with UV light may involve moving one or more UV sources through the pipe to initiate the curing process progressively along the flexible sleeve to form the pipe lining. Such pipe linings for repairing pipes are known as cured-in-place-pipes (CIPP).

Installation of the pipe liner impregnated with a curable resin may be carried out by "eversion" or "drag-in" methods. Installation by eversion involves securing the resin-impregnated pipe liner at an entrance to the pipe to be repaired and then forcing the pipe liner along the pipe whilst turning it inside out, using a pressurised fluid. Installation by drag-in involves dragging using ropes or pushing using rods, the resin-impregnated pipe liner into the pipe to be repaired.

Once the pipe liner has been installed into the pipe to be repaired, a pressurised fluid may be used to force the outer surface of the pipe liner into contact with the inner surface of the pipe to be repaired so that the pipe liner conforms to the shape of the pipe, for example by expanding a rubber bladder arranged within the pipe liner with pressurised air. This ensures that the resin comprised in the pipe liner can conform to the inner surface of the pipe to be repaired after curing to form a structurally sound continuous pipe lining which is arranged in place in the pipe.

Curing the resin completes the formation of the pipe lining which then provides a continuous barrier-coated inner surface over the damaged section of pipe. This method can be used to form a pipe lining in a relatively short section of damaged piping or to form a continuous pipe lining throughout the entire length of a pipe, for example a pipe several hundred metres long.

It is often desirable for the pipe liner to have a barrier coating on one of the inner or outer surfaces. It is particularly desirable to have a barrier coating arranged on the non-pipe contacting surface of the fabric sleeve, after installation, so that the expandable bladder (or calibration hose) can be used to press the pipe liner onto the inner surface of the pipe to be repaired without coming into contact with the curable resin. Therefore, if an eversion installation method is to be used, then the barrier coating is suitably provided on the outer surface of the pipe liner, which becomes the inner, non-pipe contacting surface of the pipe lining. If a drag-in installation method is to be used, then the barrier coating is suitably provided on the inner surface of the pipe liner, which becomes the inner, non-pipe contacting surface of the pipe lining.

Installation by eversion is generally favoured for repairing pipes with many bends which makes drag-in installation difficult and/or where the length of pipe to be repaired is relatively long, which can be generally done more efficiently by eversion.

In certain situations a drag-in installation will be favoured, for example if the pipe to be repaired is relatively short, if access to the site is poor (e.g. in small buildings or on rough or un-firm ground) or if the pipe liner and curing technology does not allow for eversion of the pipe liner (such as in some UV cured systems). In order to provide a pipe liner for drag-in installation which has a barrier coating on the inner surface, such a pipe liner is manufactured with the barrier coating as the outer surface and then everted after manufacture to provide the pipe liner with the barrier coating as the inner surface. However, eversion of the pipe liner as manufactured in this way requires a free space as long as the pipe liner for the liner to be everted into and requires friction between the fabric sleeve of an everted section of the pipe liner and an un-everted section of the pipe liner to be overcome in order to progressively evert the pipe liner. Both of these factors effectively place a length limitation on a pipe liner manufactured in this way, as typical manufacturing premises have limited space, and the friction which must be overcome to evert the pipe liner increases with increasing length of the pipe liner and typical eversion station equipment can only overcome a certain level of friction and/or the eversion fluid pressure required to overcome the friction may be higher than such pipe liners can withstand without deforming or bursting. Typically such pipe liners can only be practicably manufactured in lengths of 100 to 200 m. Therefore such pipe liners have been provided in sections which are shorter than required by the installer and/or shorter than the length of the pipe to be repaired, leading to increased installation costs as multiple installation processes have to be carried out instead of a single installation process which could be carried out if a single pipe liner of the required length could be provided.

Such pipe liners comprising a barrier coating on one of the inner or outer surfaces may be joined by welding together two opposing edges of a sheet of fabric comprising a barrier coating on one side. Welding typically involves bringing together the two opposite edges of the sheet of fabric to form a fabric sleeve with the barrier coating as the outer surface and arranging a strip of polymeric material, suitably a thermoplastic strip, along and bridging the two opposite edges of the sheet of fabric. The strip is then heated to partially melt the strip and the underlying fabric which mix together and then re-solidify to form a bond between the two side edges of the flexible sheet, through the strip. This provides a continuous barrier-coated layer on the pipe liner comprising the welding strip and the barrier coating, the strip covering and sealing the longitudinal seam. Alternatively a liquid sealant may be used to form the welded longitudinal seam. Manufacturing a pipe liner comprising a barrier coating on the outer surface of the pipe liner (as manufactured), as discussed above, allows a user to inspect visually the integrity of the welded longitudinal seam, to ensure that the welding strip has adequately covered and barrier-coated the longitudinal seam.

For the avoidance of doubt, throughout this specification the term "pipe liner" is used to refer to an item suitable for use in lining (i.e. repairing) a pipe, such as a water supply pipe or a sewer. In other words, the pipe liner is in a pre-installation state. The term "pipe lining" is used to refer to a lining installed in a pipe which effectively provides a new pipe within the pipe in which the lining is installed.

SUMMARY OF THE INVENTION

It is one aim of the present invention, amongst others, to provide a method of manufacturing pipe liners that addresses at least one disadvantage of the prior art, whether identified here or elsewhere, or to provide an alternative to existing methods. For instance it may be an aim of the present invention to provide a method of manufacturing a pipe liner comprising a longitudinal seam and a barrier coating on the inner surface of the pipe liner.

According to aspects of the present invention, there is provided a method of manufacturing a pipe liner, a method of joining a pipe liner, a method of testing a pipe liner and apparatus for carrying out said methods, as set forth in the appended claims. Other features of the invention will be apparent from the dependent claims, and the description which follows.

According to a first aspect of the present invention, there is provided a method of forming a pipe liner comprising a fabric sleeve with a barrier-coated inner surface and a longitudinal seam, the method comprising the steps of:
 a) providing a sheet of fabric comprising a barrier coating on one side;
 b) bringing two opposing side edges of the sheet of fabric together to form the fabric sleeve comprising the barrier coating on an inner surface of the fabric sleeve;
 c) providing a strip of carrier material comprising a liquid sealant on at least one surface of the strip of carrier material and arranging the strip of carrier material inside the fabric sleeve and in registration with the two opposing side edges of the sheet of fabric with the liquid sealant facing towards the two opposing side edges of the sheet of fabric; and
 d) joining together the two opposing side edges of the sheet of fabric with the strip of carrier material and the liquid sealant to form the longitudinal seam in the fabric sleeve, wherein the strip of carrier material and the sealant cover each of the two opposing side edges of the sheet of fabric, and any gap in-between the opposing side edges, to provide the barrier-coated inner surface of the fabric sleeve, and thereby provide the pipe liner.

The use of the term "barrier coating" is intended to mean that the coating which provides a barrier between fluids used for inflation of the pipe liner and the fabric of the pipe liner intended to be impregnated with a curable resin. The barrier coating is therefore substantially impermeable to a fluid typically used for inflating pipe liners in use, for example cold water, hot water, air, steam or a mixture thereof, suitably sufficiently impermeable to said fluids during the typical timescales of pipe liner installation, and at the thicknesses of barrier coating disclosed herein. The "barrier coating" may be additionally or alternatively defined as a "fluid-proof coating" and the barrier-coated inner surface of the pipe liner may be additionally or alternatively defined as a "fluid-proof" inner surface.

Suitably the step d) involves at least partially solidifying the liquid sealant to bind the two opposing side edges of the sheet of fabric and the strip of carrier material together to form the longitudinal seam. In some embodiments, the solidification is effected or completed by a subsequent step. Either way, in the pipe liner produced by the method of this first aspect, the longitudinal seam is where the fabric sleeve is joined together by a joining (or "welding") of the strip of carrier material and the liquid sealant to the two opposing side edges of the sheet of fabric. The longitudinal seam can be considered to comprise the solidified sealant, the strip of carrier material and the two opposing side edges of the sheet of fabric.

This welding of the sheet of fabric to form the longitudinal seam therefore provides a continuous barrier-coated inner surface, continuous in the sense of around the inner circumference of the pipe liner and along the length of then pipe liner, the two ends of the pipe liner being open and therefore not barrier-coated or sealed.

Suitably the method of this first aspect is a continuous and progressive manufacturing method whereby steps a) to d) are carried out simultaneously on different parts of the sheet of fabric, each part of the sheet of fabric being progressively subjected to steps a) to d) in that order, until the entire sheet of fabric has been turned into the pipe liner, or until a required length of pipe liner has been manufactured. Suitably the sheet of fabric is supplied from a roll in step a).

The inventors have found that using this method, a pipe liner comprising a barrier-coated inner surface can be directly provided by the manufacturing process without the need to subsequently evert the pipe liner, which would be necessary with known methods for the manufacture of pipe liners. Therefore the method of this first aspect may provide such a pipe liner in a longer length than would be possible and/or cost effective using known methods, for example a 1,000 m long pipe liner. Such lengths of pipe liner may be useful for installers to either carry out the repair of long pipes or to cut down to a particular size before use to suit a particular pipe to be repaired, giving the installers more flexibility and potentially less wastage of pipe liner. The method of this first aspect may also provide such a pipe liner in a more cost effective manner by omitting the eversion step discussed above, which has an associated cost related to using more equipment, energy, manufacturing time and factory space. The pipe liner provided by this method may be particularly suitable for installation by a drag-in method and would not require a calibration hose to press the pipe liner into the walls of the pipe to be repaired. An inflation fluid can simply be passed into the pipe liner impregnated with curable resin (after sealing the open ends appropriately) in order to do this, advantageously avoiding the costs associated with providing and operating a calibration hose. The pipe liner provided by this method may be particularly suitable for use with UV cured resin systems which are not suitable for installation by eversion.

Similarly, the method of this first aspect can advantageously provide a pipe liner having the barrier coating on the inside for installation by eversion so that the barrier coating is the outer pipe-contacting surface of the pipe liner after installation. Such a pipe liner may be a (first) pre-liner for a composite pipe lining which is installed into a pipe to be repaired first, followed by a second pipe liner having the barrier coating on the inside, as installed. This arrangement allows the resin impregnated fabrics of the two pipe liners to contact each other inside the pipe liner and cure together to form a continuous mass of cured resin in the composite pipe lining. This pipe liner (pre-liner) for eversion would have previously been manufactured with the barrier coating on the outside as discussed above and then everted after manufacture, before supply to the installer, to provide the barrier coating on the inside of the pipe liner. As discussed above, this eversion after manufacture effectively places a length limitation on the pipe liner due to the space required in the manufacturing premises and the friction which must be overcome during eversion of long pipe liners. Therefore the method of this first aspect may advantageously provide such pipe liners for eversion in a longer length than was previously practicable and/or possible with known methods.

The pipe liners formed by the method of this first aspect may be suitable for use in repairing damaged or degraded pipes in the way described above. Therefore the pipe liners of this first aspect may have a size and shape chosen to suit a particular pipe to be repaired. The pipe liner comprises a fabric sleeve and may be alternatively or additionally described as a generally elongate fabric structure which defines a conduit open at opposite ends. The fabric sleeve typically has a flattened tubular shape as manufactured (i.e. an elongate pipe with a cross section which is not circular) and is suitably capable of adopting a shape of a pipe to be repaired, for example a tubular shape, when installed (i.e. when the appropriate forces are applied to the fabric sleeve to force it to adopt the shape of a pipe to be repaired, for example a tubular shape). The fabric sleeve suitably has a diameter, thickness and length chosen to suit a particular pipe to be repaired. The fabric sleeve is typically flexible and can therefore adopt different shapes, for example it can be flattened for ease of manufacture and/or transportation. However, the fabric sleeve when expanded from a flattened state can suitably adopt a shape of a pipe to be repaired, for example a tubular shape either before or during installation, and provides a tubular pipe lining when installed. The pipe liner may comprise more than one fabric sleeve, arranged concentrically within each other, i.e. wherein a second fabric sleeve is arranged within the first fabric sleeve.

The pipe liner formed by the method of this first aspect is suitably in an uncompressed state, i.e. there are no compressive forces acting on the fabric sleeve (except for the weight of the fabric sleeve itself). Furthermore, the pipe liner is suitable for impregnating with a curable resin. However, the pipe liner is suitably not impregnated with a curable resin after the method of this first aspect, and is intended to be supplied to a customer without curable resin.

Therefore the fabric sleeve may comprise air pockets which can be filled with a curable resin before installation of the pipe liner in a pipe to be repaired.

The fabric sleeve comprises a longitudinal seam and is produced by joining opposite side edges of a sheet of fabric to form the longitudinal seam. The longitudinal seam is suitably arranged along the length of the fabric sleeve along opposite side edges of a sheet of fabric used to form the fabric sleeve.

The sheet of fabric used to form the fabric sleeve is suitably rectangular in shape with a pair of opposing long side edges and a pair of opposing short side edges. The fabric sheet suitably has a size selected to suit the particular diameter and length of pipe to be repaired. Typical pipes repaired in this manner have a diameter of from 5 cm to 250 cm. Therefore the pipe liner may have a diameter of from 5 cm to 250 cm and the sheet of fabric used to form the pipe liner may have a length of the short side edges which, when the opposing long side edges of the sheet are brought together, provides the fabric sleeve with an appropriate diameter of from 5 cm to 250 cm. The length of the opposing long side edges of the fabric sheet are suitably selected to provide a desired length of pipe liner, which may be between 50 cm and 10 km.

The fabric which the fabric sleeve (and the fabric sheet from which it is made) is formed from is suitably a fibrous fabric, suitably a non-woven fabric. Suitably the fabric comprises a relatively high proportion of air which is replaced by resin during preparation of the pipe liner for installation in a pipe to be repaired. The fabric therefore mainly functions as a substrate for carrying and introducing resin into a pipe to be repaired in order to form a new pipe within said pipe to be repaired. Suitably the fabric comprises from 80 to 95% air by volume, for example from 88 to 92% air by volume.

The fabric is suitably formed of a non-woven fabric, for example a felt, suitably comprising polymer fibres. The polymer fibres may be selected to be compatible with a curable resin selected for use with the pipe liner. Suitable polymer fibres may be selected from polyester, polypropylene and acrylic fibres. Suitably the fabric sleeve is formed of a polyester felt.

The fabric sleeve is suitably formed of a reinforced felt. Suitably the fabric sleeve is reinforced with a layer or reinforcing material arranged within the fabric sleeve. Suitably the fabric sleeve is formed of glass-reinforced felt, suitably glass-reinforced polyester felt. Glass-reinforced felt comprises glass fibres within the felt which provide the pipe lining formed from the pipe liner after curing said resin with additional strength, suitably tensile and flexural strength, compared to a similar felt comprising no glass fibres. The glass-reinforced felt may comprise at least one layer of glass fibre fabric. The at least one layer of glass fibre fabric may be a woven or non-woven glass fibre fabric, suitably a non-woven glass fibre fabric. The at least one layer of glass fibre fabric is suitably arranged within the felt, suitably through the centre of the felt. The glass-reinforced felt may comprise more than one such layer of glass fibre fabric which may provide additional improvements in tensile strength. The use of glass reinforced felt may be particularly suitable for lining pipes which operate under internal fluid pressure, for example in mains water supply pipes, which are subject to tensile stress from the pressure of the fluid inside the pipe acting outwardly on the walls of the pipe.

Suitably the fabric sleeve has a thickness of from 1 to 10 mm, suitably from 1 to 9 mm, suitably from 2 to 9 mm, suitably from 3 to 9 mm. The fabric sleeve suitably has substantially the same thickness throughout (i.e. around its circumference and along its length), suitably the same thickness throughout. In some embodiments, the pipe liner comprises more than one such fabric sleeve, for example two, three, four, five or more fabric sleeves, in order to provide thicker pipe liners using the same kind of fabric sleeve material.

Suitably the sheet of fabric has the barrier coating on only one side. Therefore the fabric sleeve formed in step b) only has a barrier coating on the inner surface and not on the outer surface. Suitably the outer surface of the fabric sleeve is non-barrier-coated. Suitably the barrier coating provides a continuous barrier to the inside of said pipe lining formed from the pipe liner, after the longitudinal seam has been formed with the liquid sealant and the strip of carrier material. The barrier may provide an additional fluid resistant barrier to said pipe lining formed from the pipe liner and may also be beneficial during installation of the pipe liner as it provides a barrier up to which curable resin can be pumped to fill the pipe liner with said resin.

Suitably the barrier coating is bonded to the fabric sleeve. Suitably the barrier coating is provided by a layer of polymeric material bonded to the fabric sleeve. The polymeric material may be selected from a thermoplastic polyolefin (TPO), a thermoplastic polyurethane (TPU) or a polyvinyl chloride (PVC). Suitable specific polymeric materials would be known in the art. In such embodiments, the pipe liner may be particularly suitable for installation by eversion.

In some embodiments, the barrier coating may be provided by a laminate of more than one layer of polymeric material. For example, the barrier coating may be provided by a laminate comprising a layer of polyethylene and a layer of polyamide, suitably a laminate comprising an inner of polyamide between two layers of polyethylene. In such embodiments, the pipe liner may be particularly suitable for installation by dragging-in and subsequent curing using UV light. Suitably the barrier coating has a thickness less than 2 mm, suitably less than 1 mm.

In step b), the two opposing side edges of the sheet of fabric are brought together to form the fabric sleeve comprising the barrier coating on an inner surface of the fabric sleeve. Suitably there is no overlap of the sheet of fabric where the two opposing edges are brought together. Therefore this provides a butt seam arrangement which, after joining by welding, provides a butt-welded longitudinal seam. Ways of providing such a butt-welded longitudinal seam may be known from methods of manufacturing pipe liners having a barrier coating on the outer surface of the pipe liner, as manufactured.

The fabric sleeve is suitably in a flattened state after step b).

Step c) involves providing a strip of carrier material comprising a liquid sealant on at least one surface of the strip of carrier material and arranging the strip of carrier material inside the fabric sleeve and in registration with the two opposing side edges of the sheet of fabric with the liquid sealant facing towards the two opposing side edges of the sheet of fabric.

The strip of carrier material suitably provides a supporting substrate for the liquid sealant, in order for the liquid sealant to be effectively applied to the inner surface of the fabric sleeve, at the meeting of the two opposing side edges of the sheet of fabric, in order to join (weld) the two opposing side edges together to form a butt-welded longitudinal seam. Suitably the strip of carrier material also becomes part of the butt-welded longitudinal seam, after steps c) and d).

In some embodiments, the liquid sealant is provided by melting a part of the strip of carrier material, for example by using a hot air stream applied to an upper surface of the strip of carrier material before the strip of carrier material is arranged inside the fabric sleeve. Therefore the liquid sealant may be a liquefied part of the strip of carrier material. In such embodiments the liquid sealant would be formed of the same material (i.e. polymeric material) as the strip of carrier material.

In some embodiments, the liquid sealant is separate to the strip of carrier material. In such embodiments, during step c), the liquid sealant is applied, for example from an extruder, onto an upper facing surface of the strip of carrier material, as or before (suitably just before) the strip of carrier material is arranged inside the fabric sleeve. Suitably the fabric sleeve is orientated so that the two opposing side edges of the sheet of fabric meet in an upper part of the fabric sleeve, suitably at the top of the fabric sleeve. Therefore the strip of carrier material comprising the liquid sealant on an upper facing surface of the strip of carrier material is suitably arranged underneath where the two opposing side edges of the sheet of fabric meet at the top of the fabric sleeve (i.e. to the underside of the longitudinal seam as it is formed).

Suitably, in this first aspect, step c) involves holding apart the two opposing side edges of the sheet of fabric to allow the strip of carrier material and the liquid sealant to be fed into the fabric sleeve and arranged in registration with the two opposing side edges of the sheet of fabric. The two opposing side edges of the sheet of fabric may be held apart by edge guides.

The fabric sleeve is suitably in a flattened state during and after step c).

The strip of carrier material may be formed from a similar polymeric material to the barrier coating, for example from a polymeric material which is miscible with and/or can effectively bond with the polymeric material of the barrier coating, when both are heated in a joining process. Suitably the strip of carrier material and the barrier coating are provided by substantially the same polymeric material, suitably the same polymeric material.

The liquid sealant may be a molten polymer. Suitably the molten polymer is at a temperature above the ambient temperature in which the method of this first aspect is being carried out. Suitably the temperature of the molten polymer is between 120 and 190° C. Suitably the polymer which provides the molten polymer liquid sealant has a melting point above ambient temperature, suitably significantly above ambient temperature, suitably above the expected operational temperature of the pipe lining formed from the pipe liner, suitably significantly above.

The molten polymer may be provided by a similar polymeric material to the barrier coating and/or the strip of carrier material, for example from a polymeric material which is miscible with and/or can effectively bond with the polymeric material of the barrier coating and/or the strip of carrier material, when they are heated in a joining process. Suitably the molten polymer and the barrier coating and/or the strip of carrier material are provided by substantially the same polymeric material, suitably the same polymeric material.

Suitably the molten polymer, the strip of carrier material and the barrier coating comprise similar polymeric material, suitably substantially the same polymeric material. Suitably the molten polymer, the strip of carrier material and the barrier coating comprise the same polymeric material. Suitably, at least the outer surfaces of the barrier coating and the strip of carrier material comprise the same polymeric material as the molten polymer. Suitably at least the outer surfaces of the barrier coating and the strip of carrier material are formed of the same polymeric material as the molten polymer.

For example, the molten polymer, the strip of carrier material and the barrier coating may all comprise polyurethane, suitably all consist essentially of polyurethane.

Suitably the strip of carrier material is sufficiently thick to prevent the molten polymer completely melting the strip of carrier material. Therefore the molten polymer suitably does not entirely melt the strip of carrier material during step c), suitably only partial melting and mixing of the strip of carrier material with the molten polymer and/or the barrier coating takes place. Entirely melting the strip of carrier material may prevent the strip of carrier material performing its function of delivering the liquid sealant to the inner surface of the fabric sleeve to form the welded longitudinal seam.

The strip of carrier material may have a laminate structure comprising an upper layer, a lower layer and at least one inner layer. Suitably the upper layer and suitably the lower layer are provided by a similar, substantially the same or the same polymer as the molten polymer and/or the polymeric material of the barrier coating. The inner layer of the strip of carrier material may be provided by a different polymeric material, for example a polymeric material having a higher melting temperature than the polymeric material of the upper layer and suitably the lower layer.

For example, the strip of carrier material may comprise upper and lower layers of polyethylene (suitably thermoplastic polyethylene) and an inner layer of polyamide (between the upper and lower layers), and the molten polymer and the barrier coating may comprise polyethylene (suitably thermoplastic polyethylene). Suitably the inner layer of the strip of carrier material consists essentially of polyamide and the upper layer and the lower layer of the strip of carrier material, the molten polymer and the barrier coating consist essentially of said polyethylene.

Step d) involves joining together the two opposing side edges of the sheet of fabric with the strip of carrier material and the liquid sealant to form the longitudinal seam in the fabric sleeve wherein the strip of carrier material and the sealant cover each of the two opposing side edges of the sheet of fabric, and any gap in-between the opposing side edges, to provide the barrier-coated inner surface of the fabric sleeve, and thereby provide the pipe liner.

Step d) suitably involves allowing the liquid sealant to cure and/or cool to form a welded longitudinal seam. In embodiments wherein the liquid sealant is a molten polymer, step d) suitably involves cooling the molten polymer to solidify it and form the welded longitudinal seam.

Suitably step d) involves applying pressure to the strip of carrier material, the liquid sealant and the two opposing side edges of the sheet of fabric. Applying such pressure suitably increases the adhesion of the liquid sealant to the two opposing side edges of the sheet of fabric and the strip of carrier material and/or increases the penetration of the liquid sealant into any gap in-between the two opposing side edges of the sheet of fabric. Suitably said pressure is applied during at least partial cooling/curing of the liquid sealant.

Suitably step d) involves compressing the strip of carrier material, fabric sleeve and liquid sealant together. Step d) may be carried out by directing the fabric sleeve through a set of rollers configured to compress the fabric sleeve, strip of carrier material and liquid sealant as they pass through the rollers. Alternatively, step d) may be carried out by pressing a plate onto the fabric sleeve.

Suitably step d) involves applying pressure to and cooling the strip of carrier material, the liquid sealant and the two opposing side edges of the sheet of fabric. Suitably step d) is carried out using pressure and chiller rollers which simultaneously compress and cool the strip of carrier material, the liquid sealant and the two opposing side edges of the sheet of fabric.

Step d) may involve urging the two opposing side edges of the sheet of fabric towards each other to close or partially close any gap between the two opposing side edges.

Suitably step d) involves urging the two opposing side edges of the sheet of fabric towards each other to close or partially close any gap between the two opposing side edges whilst compressing and cooling the strip of carrier material, fabric sleeve and liquid sealant together. Therefore step d) suitably provides the pipe liner in a flattened state wherein the longitudinal seam contacts the inner surface of the pipe liner on the opposite side of the pipe liner.

After step d), the liquid sealant may not be completely solidified. Therefore if the pipe liner is flattened or kept flat without further treatment, for example to pack the pipe liner for transportation to a customer, and a sufficient pressure is applied to the flattened pipe liner, the liquid sealant may stick to the opposite side of the inner surface of the pipe liner. Also, even if the liquid sealant has solidified, there may be residual heat present in the longitudinal seam from the addition of a hot molten polymer as the liquid sealant to the fabric sleeve. This may be sufficient to cause the polymeric material of the strip of carrier material or sealant to bind to the polymeric material of the barrier coating on the opposite side of the inner surface of the pipe liner.

This sticking across the inside of the pipe liner may be known as "cross-welding". Such cross-welding would give the pipe liner a permanent bond between the inner surface of the fabric sleeve across the inside space of the pipe liner and therefore would give the pipe liner a figure-of-eight cross-section. In use the pipe liner has to adopt the internal shape of the pipe to be repaired. If the pipe liner has cross-welded then it may be difficult to break such a cross-weld and allow the pipe liner to adopt the required shape. Therefore, if such a cross-weld is present, the pipe liner may have to be discarded, leading to wastage of materials and increased costs.

Therefore, the method of this first aspect may involve, after step d), a further step e) of completing solidification of the liquid sealant and/or removing residual heat from the longitudinal seam. Step e) may be considered to be a quenching step where the ability of the liquid sealant to bond to other materials is removed. Suitably step e) involves applying a coolant liquid to the liquid sealant on the inner surface of the fabric sleeve, suitably to solidify non-solidified liquid sealant and/or remove residual heat present in the pipe liner. Therefore the coolant liquid is applied to the inner surface of the fabric sleeve. If coolant liquid was added to the outer surface of the fabric sleeve, which comprises exposed fabric and does not have a barrier coating, the fabric would be wetted and would subsequently require drying before the pipe liner could be supplied to a customer for impregnation with curable resin and installation. Therefore the coolant liquid is advantageously applied to the inner surface of the fabric sleeve.

Contact of the coolant liquid with the non-solidified liquid sealant suitably transfers sufficient heat from the non-solidified liquid sealant to the coolant liquid in order for the liquid sealant to be cooled below its melting point and therefore to completely solidify. Additionally or alternatively, the contact of the coolant liquid with the strip of carrier material and the sealant at the longitudinal seam suitably transfers sufficient residual heat from the longitudinal seam to the coolant liquid in order to lower the temperature of the strip of carrier material and the sealant to below a temperature which may cause cross-welding. This quenching step is particularly suitable for when the liquid sealant is a molten polymer which solidifies on cooling.

If step e) were not carried out, the method of forming the pipe liner may have to involve providing an amount of liquid sealant on the strip of carrier material which does not completely cover the surface of the strip of carrier material when joined to the fabric step in step d). This would prevent liquid sealant flowing out from between the strip of carrier material and fabric sleeve and therefore being exposed on the inner surface of the fabric sleeve and potentially causing cross-welding on packing the pipe liner, as discussed above. This approach has the disadvantage that their would be non-welded parts (or flaps) of the strip of carrier material on the inner surface of the fabric sleeve which may provide a cosmetically undesirable finish to the pipe liner and may catch on equipment passing through the pipe liner/pipe lining and/or provide a weakness in the pipe lining. When step e) is carried out, any liquid sealant which flows out from between the strip of carrier material and fabric sleeve and becomes exposed on the inner surface of the fabric sleeve would be quenched/solidified by the coolant liquid, and would not cause cross-welding. Therefore step e) may provide the further advantage that an amount of liquid sealant can be added to the strip of carrier material in step c) which will completely cover the surface of the strip of carrier material (which welds to the fabric sleeve) after the joining step d). In doing so, cross-welding can be avoided without the undesired formation of such non-welded flaps of strip of carrier material.

In some embodiments, step e) involves passing the pipe liner through a quench station of a pipe liner production line, the quench station comprising an entry point, an exit point and a low point, wherein the entry point and the exit point are above the low point, and wherein the pipe liner comprises the coolant liquid at the low point which completely fills a section of the pipe liner passing through the low point. The pipe liner may be passed into and through the quench station by rollers. Suitably the quench station forces the pipe liner to adopt a U- or V-shape as it passes through the quench station, with the bottom of U- or V-shape being the low point, suitably by appropriately configured rollers.

In such embodiments, a sufficient quantity of the coolant liquid is introduced into an open end of the first section of pipe liner to be formed and to reach the quench station. This allows the coolant liquid to flow under gravity to the section of pipe liner currently occupying the low point of the quench station. The coolant liquid is provided in a sufficient quantity to completely fill the section of the pipe liner located at the low point so that the coolant liquid contacts a complete circumference of the inner surface of the pipe liner at least at the low point of the quench station, to ensure that the coolant liquid contacts the liquid sealant at the longitudinal seam of the pipe liner in this section and subsequently all along the pipe liner as it is progressively formed.

As the pipe liner is manufactured and moves along the production line, passing through the quench station, the coolant liquid remains at the low point of the quench station and therefore in effect moves along the pipe liner, solidifying any un-solidified liquid sealant and/or removing residual heat at the longitudinal seam and thereby preventing cross-welding. As the inner surface of the pipe liner is barrier-coated, the coolant liquid does not penetrate the fabric sleeve or leak out of the pipe liner, unless there is a fault in the pipe liner.

The coolant liquid may be water. Suitably the coolant liquid has a temperature significantly below the melting point of the liquid sealant, suitably ambient temperature or below, suitably below ambient temperature. The coolant liquid may heat up during manufacture of the pipe liner as heat is transferred from the sealant/strip of carrier material to the coolant liquid. Suitably the volume of coolant liquid used and the initial temperature of the coolant liquid are set so that the amount of heat transferred from the sealant/strip of carrier material to the coolant liquid during manufacture of the pipe liner does not heat up the coolant liquid to such an extent that the function of the coolant liquid in quenching/solidifying the sealant/strip of carrier material is adversely affected. In some embodiments the coolant liquid in the quench station may be actively cooled during the method of manufacturing the pipe liner to maintain a temperature adequate for the coolant liquid to perform its function.

In some embodiments, the coolant liquid comprises a dye and therefore may be coloured. Suitably the dye colours the coolant liquid so that the coolant liquid is easily recognisable. Suitably the dye provides a colour of the coolant liquid which is different to the colour of the fabric sleeve of the pipe liner. Pipe liners may be typically produced from white or off-white fabric. Therefore the dye may be selected to give the coolant liquid a colour which is distinctive against a white or off-white fabric, for example red. Providing a dye in the coolant liquid in this manner allows an operator of the pipe liner manufacturing process to observe whether any coolant liquid leaks out of the pipe liner in the quench station where the inside of the pipe liner is completely filled with the coolant liquid at the low point of the quench station. Therefore, the dye in the coolant water can be used to test the integrity of the longitudinal seam after manufacture. If any of the coloured coolant water is present on the outer surface of the pipe liner, which is suitably exposed fabric without a barrier coating, then the longitudinal seam, or other part of the inner surface of the pipe liner, must not be waterproof and is therefore faulty. The presence or absence of the coloured coolant liquid can be determined by an operator as the pipe liner passes through the quench station, or at a later stage before packing and shipping the pipe liner.

This testing can then allow faulty pipe liners to be discarded and errors in the manufacturing process to be corrected. The use of a dye in the coolant liquid may therefore provide improvements in the quality control of a pipe liner manufacturing process.

Step e) may therefore alternatively or additionally function as a testing step. The quench station may therefore be alternatively or additionally termed a "test station".

Additionally, step e) suitably causes the pipe liner to adopt its fully inflated tubular shape which it will require in use. Therefore step e) may allow an operator to assess whether the pipe liner has been manufactured correctly and in particular whether any cross-welding has already occurred during the steps c) and d). Step e) may provide the further advantage of pulling apart any nascent cross-weld that has started to form during steps c) and d).

After step e), the liquid sealant is suitably completely solidified and/or substantially all residual heat from the addition of the liquid sealant has been removed from the longitudinal seam. Therefore the pipe liner can be flattened so that the longitudinal seam contacts an opposite side of the inner surface of the pipe liner without cross-welding occurring.

After step e), the inner surface of the pipe liner is suitably completely waterproof and this has been confirmed by a lack of coloured coolant water leaking through to the fabric on the outer surface of the pipe liner.

The method of this first aspect may comprise a further step f) of flattening the pipe liner for storage and/or transportation. Step f) may involve rolling the pipe liner onto a drum or spool. Step f) may involve laying the pipe liner in folded lengths onto a pallet. Suitably step e) has been carried out prior to step f) so that the pipe liner does not cross-weld during or after step f).

According to a second aspect of the present invention, there is provided a method of joining a sheet of fabric together to form a pipe liner comprising a fabric sleeve with a barrier-coated inner surface and a longitudinal seam, the method comprising the steps of:
  a) providing a sheet of fabric comprising a barrier coating on one side;
  b) bringing two opposing side edges of the sheet of fabric together to form the fabric sleeve comprising the barrier coating on an inner surface of the fabric sleeve;
  c) applying a molten polymer to each of the two opposing side edges of the sheet of fabric on the inner surface of the fabric sleeve and to any gap in-between the opposing side edges;
  d) joining together the two opposing side edges of the sheet of fabric with the molten polymer to form the longitudinal seam in the fabric sleeve to provide the barrier-coated inner surface of the fabric sleeve and thereby provide the pipe liner;
  e) applying a coolant liquid to the longitudinal seam on the inner surface of the fabric sleeve.

The sheet of fabric, the pipe liner and steps a) to e) of this second aspect may have any of the suitable features or advantages described in relation to the first aspect.

Suitably the method of this second aspect is a continuous and progressive manufacturing method whereby steps a) to e) are carried out simultaneously on different parts of the sheet of fabric, each part of the sheet of fabric being progressively subjected to steps a) to e) in that order, until the entire sheet of fabric has been turned into the pipe liner, or until a required length of pipe liner has been manufactured.

In some embodiments, step c) involves melting a part of the strip of carrier material, for example by using a hot air stream applied to an upper surface of the strip of carrier material in order to form the molten polymer on an upper surface of the strip of carrier material. The strip of carrier material comprising the molten polymer may then be applied to each of the two opposing side edges of the sheet of fabric on the inner surface of the fabric sleeve and to any gap in-between the opposing side edges Suitably step e) involves passing the pipe liner through a quench station comprising an entry point, an exit point and a low point, wherein the entry point and the exit point are above the low point, and wherein the pipe liner comprises a liquid at the low point which completely fills a section of the pipe liner passing through the low point.

Suitably step e) prevents cross-welding of the pipe liner as discussed in relation to step e) of the first aspect. In this second aspect, cross-welding may otherwise occur as a result of the molten polymer not being completely solidified after steps c) and d) and/or as a result of residual heat from the molten polymer being present after steps c) and d), as described in relation to the strip of carrier material/liquid sealant of the first aspect.

The method of this second aspect may comprise an additional step f) of flattening the pipe liner for storage and/or transportation, as described in relation to the first aspect.

According to a third aspect of the present invention, there is provided a method of testing a longitudinal seam of a pipe liner during manufacture on a production line, the pipe liner comprising a fabric sleeve with a barrier-coated inner surface, the method comprising the steps of:
  1) receiving the pipe liner from a joining station of said production line;
  2) passing the pipe liner through a test station comprising an entry point, an exit point and a low point, wherein the entry point and the exit point are above the low point, and wherein the pipe liner comprises a test liquid comprising a dye at the low point which completely fills a section of the pipe liner passing through the low point, wherein the test liquid moves along the pipe liner as the pipe liner passes through the test station;
  3) observing whether the test liquid penetrates through the longitudinal seam to an outer surface of the fabric sleeve.

The pipe liner and the method of manufacturing the pipe liner may have any of the suitable features and advantages described in relation to the first aspect of the present invention.

The steps 1) to 3) of the method of this third aspect are suitably carried out in the order step 1) followed by step 2) followed by step 3). Alternatively, steps 2) and 3) may be carried out simultaneously, after step 1).

Step 2) of passing the pipe liner through a test station may comprise any of the suitable features and advantages of step e) of the first or second aspects of the present invention.

Suitably the dye has a colour which is different to the colour of the fabric sleeve of the pipe liner and therefore the test liquid has a colour which is different to the colour of the fabric sleeve.

The test liquid may have any of the suitable features and advantages of the coolant described in relation to the first and second aspects of the present invention. The test liquid may also function as a coolant liquid, as described in relation to the first and second aspects of the present invention. Suitably the test liquid is water, suitably an aqueous solution of the dye.

According to a fourth aspect of the present invention, there is provided an apparatus for forming a pipe liner comprising a fabric sleeve with a barrier-coated inner surface and a longitudinal seam, the apparatus comprising:
  a forming station comprising a folding mechanism configured to bring two opposing side edges of a sheet of fabric together to form said fabric sleeve;
  a liquid sealant extruder configured to extrude liquid sealant onto a strip of carrier material before said strip of carrier material is arranged inside said fabric sleeve;
  a strip of carrier material applicator configured to dispense and arrange a strip of carrier material inside said fabric sleeve and in registration with said two opposing side edges of said sheet of fabric, with said liquid sealant facing towards said two opposing side edges of said sheet of fabric; and a joining station configured to apply pressure to said fabric sleeve and form said longitudinal seam of said pipe liner.

The apparatus of this fourth aspect may be particularly suitable and/or configured for carrying out a method according to the first aspect of the present invention.

The forming station may comprise edge guides for directing said two opposing side edges of said sheet of fabric together as said sheet of fabric passes through the apparatus.

In some embodiments, the liquid sealant extruder may be replaced by a heater for melting an upper surface of the strip of carrier material before said strip of carrier material is arranged inside said fabric sleeve. For example, the heater may be a hot air jet.

The strip of carrier material applicator suitably comprises a roll of the strip of carrier material which can be progressively dispensed into said fabric sleeve. The strip of carrier material applicator may comprise a chute configured to guide said strip of carrier material into said fabric sleeve.

The joining station may comprise a static weight for applying said pressure to said fabric sleeve. Alternatively, the joining station may comprise a roller for applying said pressure to said fabric sleeve.

Suitably the joining station is configured to apply pressure to and cool the strip of carrier material, the liquid sealant and the two opposing side edges of the sheet of fabric. Suitably the joining station comprises pressure and chiller rollers for simultaneously compressing and cooling the strip of carrier material, the liquid sealant and the two opposing side edges of the sheet of fabric.

The apparatus of the this fourth aspect may comprises a quench station configured to apply a coolant liquid along said longitudinal seam on said inner surface of said pipe liner. The quench station may have any of the suitably features and advantages described in relation to the quench station of the apparatus of the fifth aspect.

According to a fifth aspect of the present invention, there is provided an apparatus for forming a pipe liner comprising a fabric sleeve with a barrier-coated inner surface and a longitudinal seam, the apparatus comprising:

a forming station comprising a folding mechanism configured to bring two opposing side edges of a sheet of fabric together to form said fabric sleeve;

a liquid sealant extruder configured to apply a molten sealant to said two opposing side edges of said sheet of fabric, on said inner surface of said fabric sleeve, to form said longitudinal seam of said pipe liner;

a joining station configured to apply pressure to said fabric sleeve and form said longitudinal seam of said pipe liner; and a quench station configured to apply a coolant liquid along said longitudinal seam on said inner surface of said pipe liner.

The apparatus of this fifth aspect may be particularly suitable and/or configured for carrying out a method according to the second aspect of the present invention.

The forming station and the joining station may have any of the suitable features described in relation to the apparatus of the fourth aspect.

In some embodiments, the liquid sealant extruder may be replaced by a heater for melting an upper surface of a strip of carrier material before said strip of carrier material is arranged inside said fabric sleeve. For example, the heater may be a hot air jet.

The quench station suitably comprises an entry point, an exit point and a low point, wherein the entry point and the exit point are above the low point so that a liquid can completely fill a section of said pipe liner passing through the low section. The quench station suitably comprises three rollers, one at each of the entry point, the exit point and the low point, for feeding said pipe liner through the quench station, suitably whilst adopting a U- or V-shape as discussed in relation to the first aspect. Suitably the rollers at the entry and exit point are pressure rollers which compress and grip said pipe liner against the weight of said coolant liquid at the low point, as said pipe liner is propelled through the quench station, suitably by a set of drive rollers located downstream from the quench station. Suitably the roller at the low point is not a pressure roller and allows said pipe liner to adopt its fully or substantially fully expanded tubular shape due to the presence of said coolant liquid.

Suitably the quench station comprises a tray arranged underneath the low point of the quench station for collecting said coolant liquid, for example if said coolant liquid leaks out of said pipe liner or when manufacture of said pipe liner is complete and an open end of said pipe liner passes through the quench station and therefore causes said coolant liquid to drain out of said open end of said pipe liner as it passes the low point of the quench station. Suitably the tray has a capacity exceeding that of the volume of said coolant liquid intended to be used.

According to a sixth aspect of the present invention, there is provided an apparatus for forming a pipe liner comprising a fabric sleeve with a barrier-coated inner surface and a longitudinal seam, the apparatus comprising:

a forming station comprising a folding mechanism configured to bring two opposing side edges of a sheet of fabric together to form said fabric sleeve;

a joining station configured to form said longitudinal seam of said pipe liner; and a quench/test station comprising an entry point, an exit point and a low point, wherein the entry point and the exit point are above the low point so that a liquid can completely fill a section of said pipe liner passing through the low section.

The apparatus of this sixth aspect may be particularly suitable and/or configured for carrying out a method according to the third aspect of the present invention.

The forming station, joining station and quench/test station may have any of the suitable features and advantages of the forming station, joining station and quench station of the apparatus of the fourth and fifth aspects of the present invention, where appropriate.

BRIEF DESCRIPTION OF THE DRAWINGS

For a better understanding of the invention, and to show how example embodiments may be carried into effect, reference will now be made to the accompanying drawings in which:

FIG. 1 also shows a cross sectional view of sheet of fabric 1/fabric sleeve 10/pipe liner 100 at each stage of the method 200.

DETAILED DESCRIPTION OF THE EXAMPLE EMBODIMENTS

Figure 1:
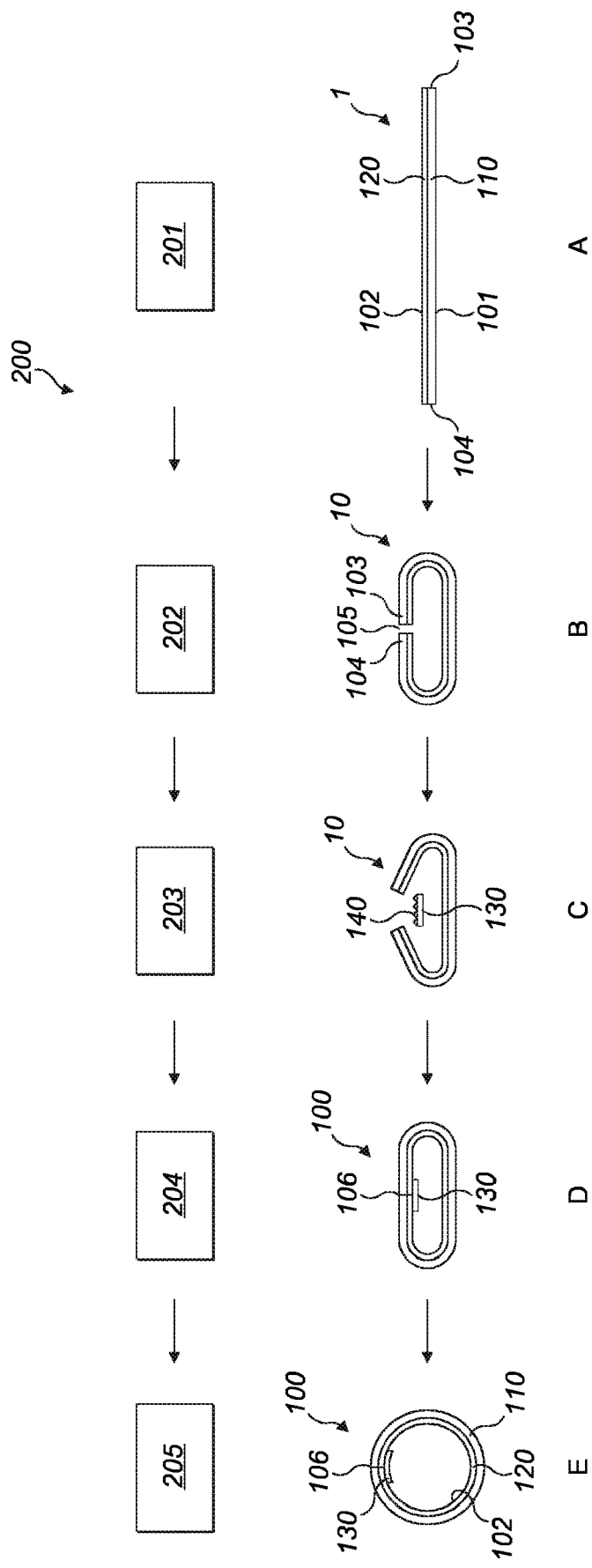
FIG. 1 is a schematic of method 200 of the first aspect of the present invention for forming a pipe liner.

FIG. 1 shows the steps 201 to 205 of method 200 of forming a pipe liner according to the present invention, and the cross section/orientation of the sheet of fabric 1 in each of said method steps as it is being formed into a pipe liner 100. In step 201, a sheet of fabric 1 is provided in the orientation A, suitably from a roll. The sheet of fabric 1 comprises a felt main body 110 exposed on side 101 which is to be the outer surface of the pipe liner, and a barrier coating 120 on the other side 102 which is to be the inner surface of the pipe liner. The sheet of fabric 1 has two opposing side edges 103 and 104.

In step 202, the sheet of fabric 100 has been folded over so that opposing side edges 103 and 104 have been brought together to meet at 105, to form fabric sleeve 10 which has adopted the flattened orientation B.

In step 203, the opposing side edges 103 and 104 have been moved apart to allow a strip of carrier material 130 comprising liquid sealant 140 to be inserted into the fabric sleeve 10 underneath opposing side edges 103 and 104 as shown in orientation C, so that the liquid sealant faces towards the two opposing side edges 103 and 104 of the sheet of fabric.

In step 204, the opposing side edges 103 and 104 have been brought back together and joined with each other, with the strip of carrier material 130 and with the liquid sealant 140 to form the longitudinal seam 106, as shown in orientation D, using suitable guides and pressurising equipment. The strip of carrier material 130 and the sealant 140 cover each of the two opposing side edges of the sheet of fabric, and any gap in-between the opposing side edges, to provide the pipe liner 100 having a barrier-coated inner surface 102.

In step 205, the pipe liner 100 has been expanded by applying a coolant liquid to the inner surface of the fabric sleeve 10, in order to quench any liquid sealant 140 exposed on the inner surface of the pipe liner 100 and to test the integrity of the barrier coating 120 and the longitudinal seam 106.

Figure 2:
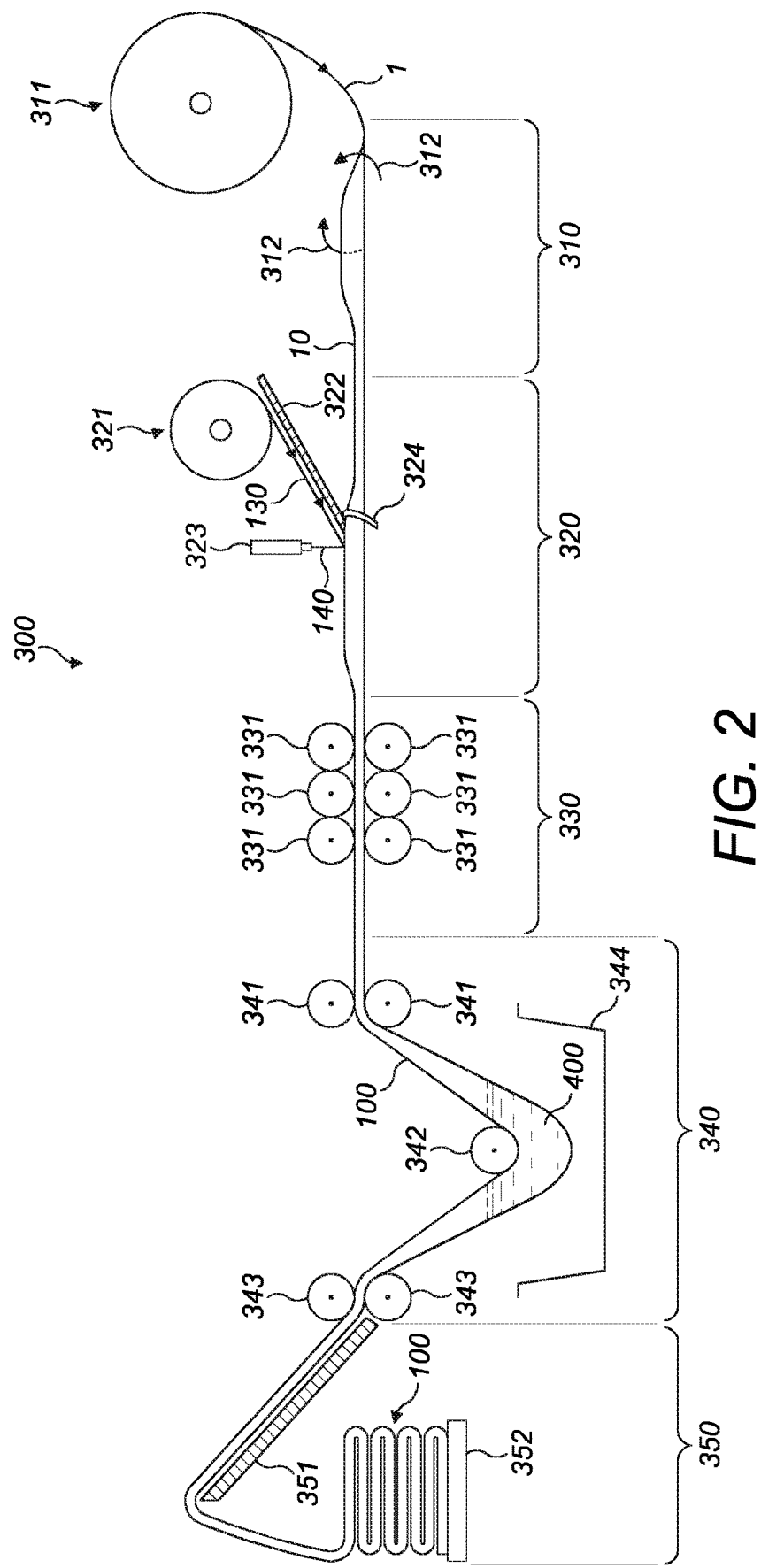
FIG. 2 shows a schematic of the apparatus 300 of the fourth aspect of the present invention for forming a pipe liner.

This method will now be described in more detail in reference to the apparatus 300 of FIG. 2. Apparatus 300 is a production line configured to manufacture pipe liners having a barrier-coated inner surface and an exposed fabric outer surface, for impregnating with curable resin and then for use in repairing damaged pipes as discussed herein. Apparatus 300 comprises a folding station 310, a strip of carrier material application station 320, a joining station 330, a quenching station 340 and a stacking station 350. The folding station 310 is fed with a sheet of fabric 1, for example a sheet of polyester felt having a thickness of 5 mm and comprising barrier coating provided by a thin layer of polyurethane, from a roll 311. The support table/conveyor on which the sheet of fabric 1 is arranged is omitted for clarity. The sheet of fabric 1 is arranged on the conveyor with the barrier coating side up and the exposed fabric side down. The folding station comprises side walls and edge guides which fold over the opposing side edges 103 and 104 of the sheet of fabric 100 in the direction shown by arrows 312 so that they meet and form a flattened tube shape of fabric sleeve 10. Tension in the sheet of fabric provided by driver rollers further downstream on the apparatus (not shown) assists in retaining the flattened tube orientation of the fabric sleeve 10.

Figure 3:
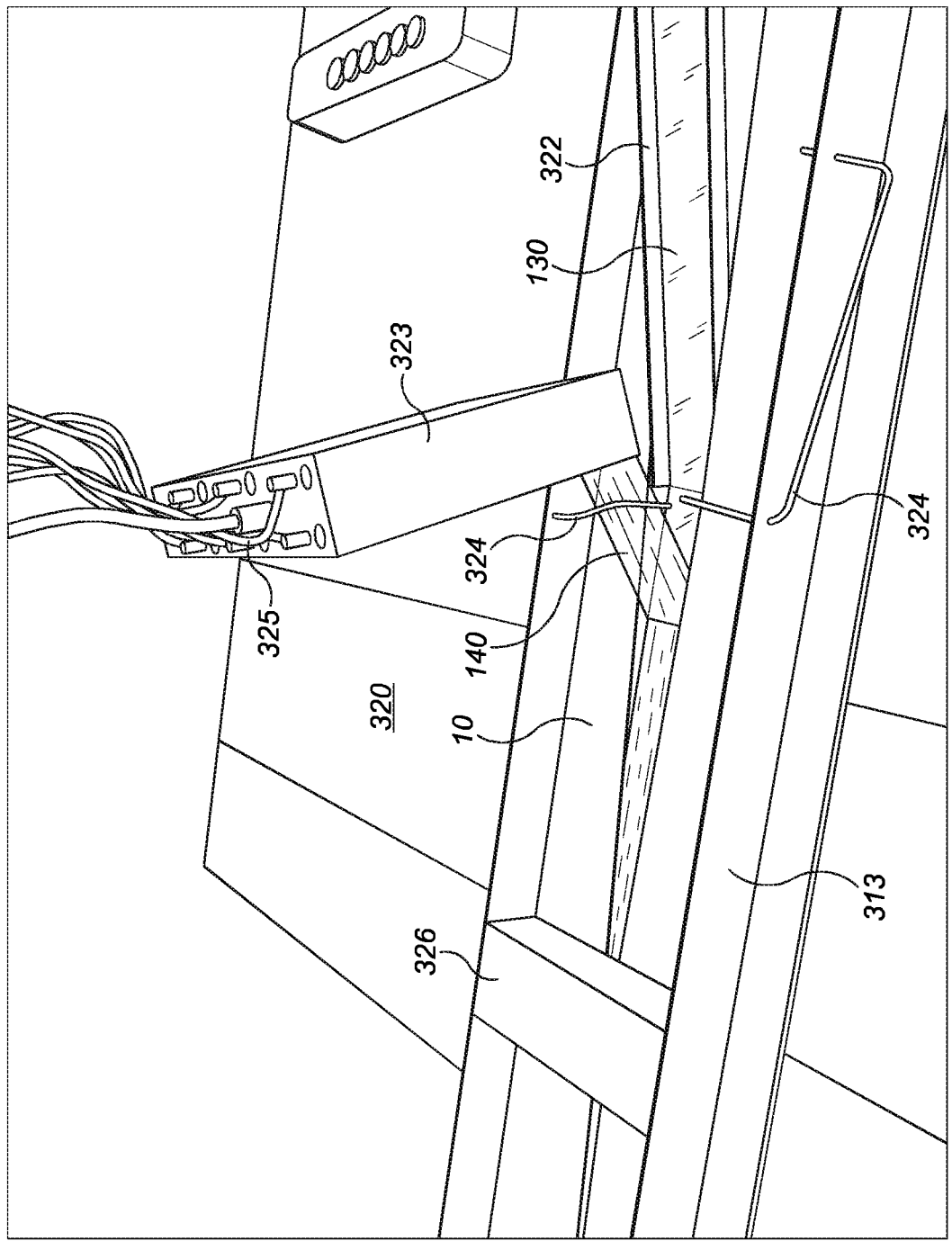
FIG. 3 shows a perspective view of an apparatus 320 for use in the method 200.

The fabric sleeve 10 is then passed to the strip of carrier material application station 320 in this orientation. The strip of carrier material application station 320 comprises strip of carrier material roll 321, strip of carrier material chute 322, extruder 323 and edge guides 324. The edge guides 324 contact the opposing side edges 103 and 104 of the fabric sleeve 10 in order to spread them apart sufficiently for the end of the strip of carrier material chute 322 to be arranged inside the fabric sleeve 10 through a gap between said two opposing side edges 103 and 104. The strip of carrier material roll 321 dispenses a strip of carrier material 130, for example a strip of polyurethane, into the strip of carrier material chute 322 which directs said strip of carrier material 130 into the fabric sleeve 10 in a position underneath the two opposing side edges 103 and 104. As the strip of carrier material 130 moves down the strip of carrier material chute 322, the extruder 323 extrudes liquid sealant 140, for example molten polyurethane, onto the upper facing surface of the strip of carrier material 130 so that the liquid sealant 140 is arranged between the two opposing side edges 103 and 104 of the fabric sleeve 100 and the strip of carrier material 130. This arrangement and functionality of the strip of carrier material application station 320 is shown in more detail in FIG. 3. Here the side walls 313 of the production line are shown holding in and directing the fabric sleeve 10 through the strip of carrier material application station 320 and these side walls 313 are provided with edge guides 324 which can be seen holding open the fabric sleeve 10 as it progresses through the strip of carrier material application station 320. This opening of the fabric sleeve 10 allows the strip of carrier material chute 322 to direct the strip of carrier material 130 into the fabric sleeve 100. As the strip of carrier material 130 progresses down the strip of carrier material chute 322, the extruder 323, supplied by liquid sealant supply line 325, deposits the liquid sealant 140 onto the strip 130 as it enters the fabric sleeve 10. Weight 326 is arranged downstream of the strip of carrier material chute 322 and functions to close the opening of the fabric sleeve 10 after insertion of the strip of carrier material 130 and the liquid sealant 140. Weight 326 may be omitted and the function of closing the fabric sleeve 10 may be performed by the chiller rollers 331.

The fabric sleeve 10 is then passed to the joining station 330. The joining station 330 comprises chiller rollers 331 which apply pressure to and simultaneously cool the fabric sleeve 100 comprising the strip of carrier material 130 and the liquid sealant 140 in order bond together the two opposing side edges 103 and 104 of the fabric sleeve 100 to the strip of carrier material 130 and the sealant 140, to form said longitudinal seam 106 and so to form a continuous barrier on the inner surface of the pipe liner 100.

The pipe liner 100 is then passed to the quenching station 340. The quenching station 340 comprises entry point roller 341, low point roller 342 and exit point roller 343. As shown in FIG. 2, these rollers direct the pipe liner 100 into a v-shape as it passes through the quenching station. At the low point of the v-shape, the pipe liner 100 comprises an aqueous solution 400 of a suitable dye, for example a red dye, but this could be any colour of dye which would contrast well with the white/off-white colour of the fabric of the pipe liner. The aqueous solution 400 is present in an amount which completely fills a short section of the pipe liner 100. This aqueous solution of dye 400 was introduced into the pipe liner 100 when the leading end of the pipe liner 100 reached the exit point of the quenching station 340. The aqueous solution of dye 400 contacts the entire inner surface of the pipe liner 100 progressively as it passes through the quenching station 340, remaining at the low point of the quenching station 340 due to gravity. When the aqueous solution of dye 400 contacts the inner surface of the pipe liner 100, it solidifies (through cooling) any liquid sealant which is exposed on the inner surface of the pipe liner 100 and which has not been solidified by the chiller rollers 331 in the joining station 330. Also, the aqueous solution of dye 400 tests the barrier coating for leaks, as any dye which is visible on the exposed outer fabric of the pipe liner 100 must have leaked through a gap or fault in the pipe liner 100. This provides a clear indication of the manufacturing quality of the pipe liner for the operator, which helps to provide an efficient and effective manufacturing process. The quenching station also comprises a vessel 344 for catching any of the aqueous solution of dye 400 which leaks out of the pipe liner 100 and also for catching the aqueous solution of dye 400 which drains out of a trailing end of the pipe liner 100 when it passes through the quench station after completion of the manufacture of the pipe liner 100.

The pipe liner 100 is then passed to the stacking station 350 which comprises ramp 351 and pallet 352. The pipe liner 100 is directed up the ramp 351, allowing any of the aqueous solution of dye 400 inside the pipe liner 100 to drain to the low point of the quenching station 340. From the top of the ramp, the pipe liner 100 is directed to the pallet 352 for stacking in a flattened state. The pipe liner 100 is then ready for transportation to a customer, suitably free of leaks and cross-welded regions which would affect the function of the pipe liner 100.

In summary, the present invention provides a method of manufacturing a pipe liner for lining the inside of a pipe, for example a water or sewerage pipe requiring repair. The pipe liner is mainly formed of a fabric sleeve, or a plurality of fabric sleeves, and comprises a fluid-proof barrier coating on the inside surface of the pipe liner. The method involves arranging a strip of carrier material comprising a liquid sealant inside the fabric sleeve of the pipe liner and in registration with two opposing side edges of the sheet of fabric, facing an inner barrier coating of the fabric sleeve. The method can advantageously provide such a pipe liner with an inner barrier coating without everting the pipe liner after manufacture. The present invention may also provide a way of avoiding internal cross-welding of said pipe liners and a method for testing the integrity of the barrier coating of said pipe liners. The present invention also provides an apparatus for carrying out these methods.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention.

Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A method of forming a pipe liner comprising a fabric sleeve with a barrier-coated inner surface and a longitudinal seam, the method comprising the steps of:
   a) providing a sheet of fabric comprising a barrier coating on one side;
   b) bringing two opposing side edges of the sheet of fabric together to form the fabric sleeve comprising the barrier coating on an inner surface of the fabric sleeve;
   c) providing a strip of carrier material comprising a liquid sealant on at least one surface of the strip of carrier material and arranging the strip of carrier material inside the fabric sleeve and in registration with the two opposing side edges of the sheet of fabric with the liquid sealant facing towards the two opposing side edges of the sheet of fabric; and
   d) joining together the two opposing side edges of the sheet of fabric with the strip of carrier material and the liquid sealant to form the longitudinal seam in the fabric sleeve wherein the strip of carrier material and the liquid sealant cover each of the two opposing side edges of the sheet of fabric, and any gap in-between the two opposing side edges, to provide the barrier-coated inner surface of the fabric sleeve, and thereby provide the pipe liner.

2. The method according to claim 1, wherein the liquid sealant is a molten polymer.

3. The method according to claim 2, wherein the molten polymer, the strip of carrier material and the barrier coating comprise a same polymeric material.

4. The method according to claim 1, wherein step d) involves applying pressure to the strip of carrier material, the liquid sealant and the two opposing side edges of the sheet of fabric.

5. The method according to claim 1, comprising, after step d), a step e) of applying a coolant liquid to the liquid sealant on the inner surface of the fabric sleeve.

6. The method according to claim 5, wherein step e) involves passing the pipe liner through a quench station comprising an entry point, an exit point and a low point, wherein the entry point and the exit point are above the low point, and wherein the pipe liner comprises the coolant liquid at the low point which completely fills a section of the pipe liner passing through the low point.

7. The method according to claim 6, wherein the coolant liquid comprises a dye.

8. The method according to claim 1 comprising a step f) of flattening the pipe liner for storage and/or transportation.

9. A method of joining a sheet of fabric together to form a pipe liner comprising a fabric sleeve with a barrier-coated inner surface and a longitudinal seam, the method comprising the steps of:
   a) providing a sheet of fabric comprising a barrier coating on one side;
   b) bringing two opposing side edges of the sheet of fabric together to form the fabric sleeve comprising the barrier coating on an inner surface of the fabric sleeve;
   c) applying a molten polymer to each of the two opposing side edges of the sheet of fabric on the inner surface of the fabric sleeve and to any gap in-between the opposing side edges;
   d) joining together the two opposing side edges of the sheet of fabric with the molten polymer to form the longitudinal seam in the fabric sleeve to provide the barrier-coated inner surface of the fabric sleeve and thereby provide the pipe liner; and
   e) applying a coolant liquid to the longitudinal seam on the inner surface of the fabric sleeve.

10. The method of claim 9, wherein step e) involves passing the pipe liner through a quench station comprising an entry point, an exit point and a low point, wherein the entry point and the exit point are above the low point, and wherein the pipe liner comprises a liquid at the low point which completely fills a section of the pipe liner passing through the low point.

11. An apparatus for forming the pipe liner according to the method of claim 1, the apparatus comprising:
   a forming station comprising a folding mechanism configured to bring the two opposing side edges of the sheet of fabric together to form said fabric sleeve;
   a liquid sealant extruder configured to extrude the liquid sealant onto the strip of carrier material before said strip of carrier material is arranged inside said fabric sleeve;
   a strip of carrier material applicator configured to dispense and arrange the strip of carrier material inside said fabric sleeve and in registration with said two opposing side edges of said sheet of fabric, with said liquid sealant facing towards said two opposing side edges of said sheet of fabric; and
   a joining station configured to apply pressure to said fabric sleeve and form said longitudinal seam of said pipe liner.

12. An apparatus for forming the pipe liner according to the method of claim 9, the apparatus comprising:
   a forming station comprising a folding mechanism configured to bring the two opposing side edges of the sheet of fabric together to form said fabric sleeve;
   a liquid sealant extruder configured to apply the molten polymer to said two opposing side edges of said sheet of fabric, on said inner surface of said fabric sleeve, to form said longitudinal seam of said pipe liner;
   a joining station configured to apply pressure to said fabric sleeve and form said longitudinal seam of said pipe liner; and
   a quench station configured to apply the coolant liquid along said longitudinal seam on said inner surface of said pipe liner.

* * * * *